US011829823B2

(12) United States Patent
Kaneda et al.

(10) Patent No.: US 11,829,823 B2
(45) Date of Patent: Nov. 28, 2023

(54) PRINTING APPARATUS, PRINTING CONTROL METHOD, AND STORAGE MEDIUM

(71) Applicant: CANON KABUSHIKI KAISHA, Tokyo (JP)

(72) Inventors: Takeshi Kaneda, Chiba (JP); Masaki Kashiwagi, Kanagawa (JP); Junichi Mori, Ibaraki (JP); Aya Kasahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/084,780

(22) Filed: Dec. 20, 2022

(65) Prior Publication Data
US 2023/0122307 A1 Apr. 20, 2023

Related U.S. Application Data

(62) Division of application No. 17/179,464, filed on Feb. 19, 2021, now Pat. No. 11,562,189.

(30) Foreign Application Priority Data

Feb. 27, 2020 (JP) .................. 2020-031678

(51) Int. Cl.
*G06K 15/02* (2006.01)
*G06K 15/00* (2006.01)
(52) U.S. Cl.
CPC ....... *G06K 15/1878* (2013.01); *G06K 15/027* (2013.01); *G06K 15/1813* (2013.01); *G06K 15/4065* (2013.01)
(58) Field of Classification Search
CPC ............. G06K 15/027; G06K 15/1813; G06K 15/4065

(Continued)

(56) References Cited

U.S. PATENT DOCUMENTS 8,665,492 B2   3/2014  Toriyabe
11,562,189 B2*  1/2023  Kaneda ............... G06K 15/027
(Continued)

FOREIGN PATENT DOCUMENTS

| CN | 102158627 A | 8/2011 |
| JP | 2007-036411 A | 2/2007 |
| JP | 2015-225170 A | 12/2015 |

OTHER PUBLICATIONS

European Search Report dated Jul. 9, 2021, in related European Patent Application No. 21159173.0.

(Continued)

*Primary Examiner* — Quang N Vo
(74) *Attorney, Agent, or Firm* — VENABLE LLP

(57) ABSTRACT

A printing apparatus includes an image forming portion which forms a chart image on a sheet conveyed from a sheet feeding deck, a color measure portion which performs color measurement by reading the chart image formed by the image forming portion, and one or more controllers including one or more processors and one or more memories. The one or more controllers are configured to generate correction data based on color measurement results by the color measurer portion and a reference value, and perform correction for target image data by using the generated correction data. The reference value is obtained by performing color measurement by the color measure portion and is registered in association with a type of sheet on which the chart image is formed, and in a case where the type of sheet on which the chart image is formed is changed, the reference value is updated.

10 Claims, 16 Drawing Sheets

(58) Field of Classification Search
USPC .............................. 358/3.27, 3.26, 1.9, 1.15
See application file for complete search history.

(56) References Cited

U.S. PATENT DOCUMENTS

| | | |
|---|---|---|
| 2005/0169651 A1 | 8/2005 | Yamada |
| 2007/0229923 A1 | 10/2007 | Itagaki et al. |
| 2011/0176155 A1 | 7/2011 | Toriyabe |

OTHER PUBLICATIONS

Chinese Office Action dated Nov. 3, 2022, in related Chinese Patent Application No. 202110227327.2 (with English translation).

* cited by examiner

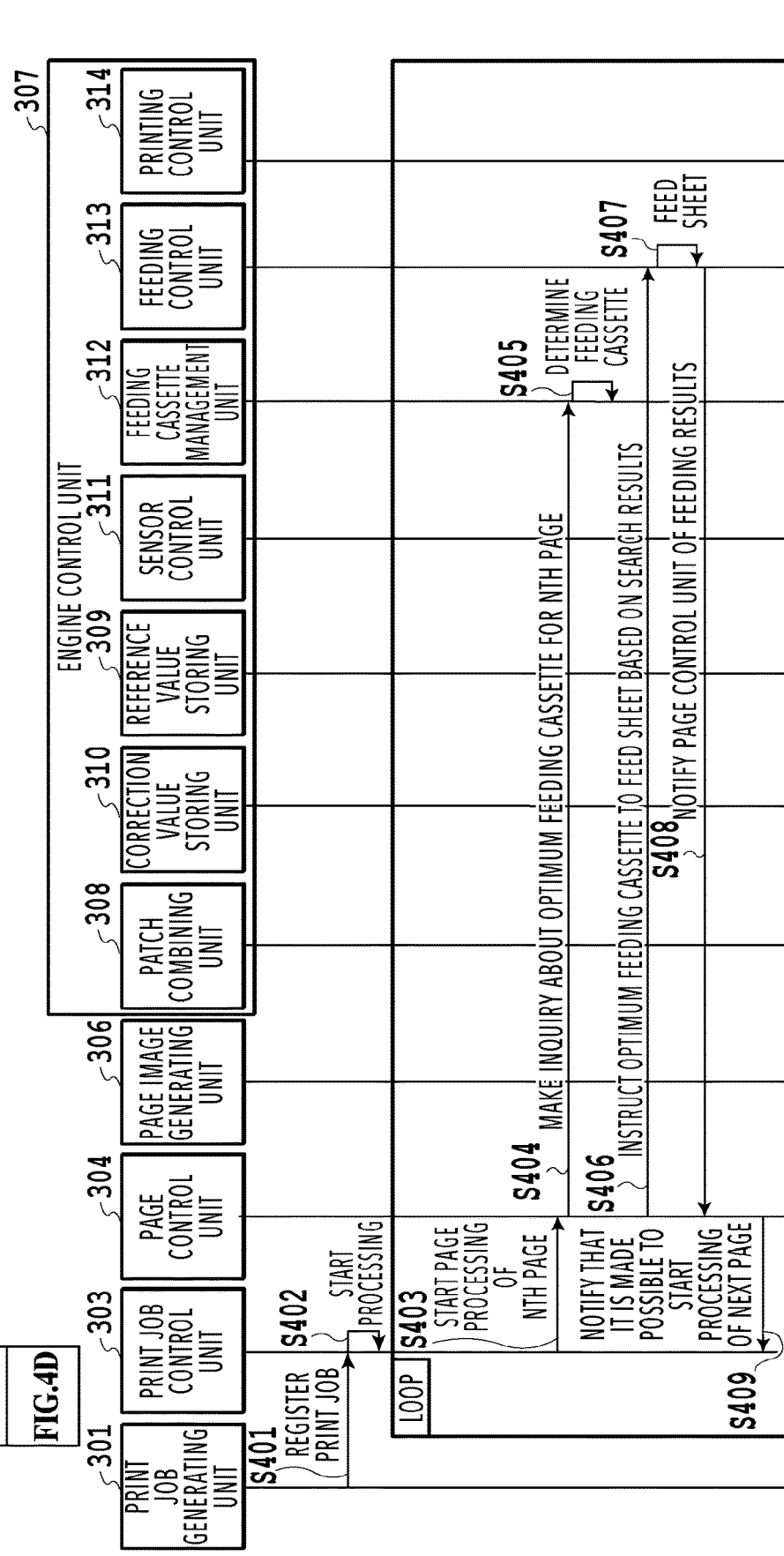

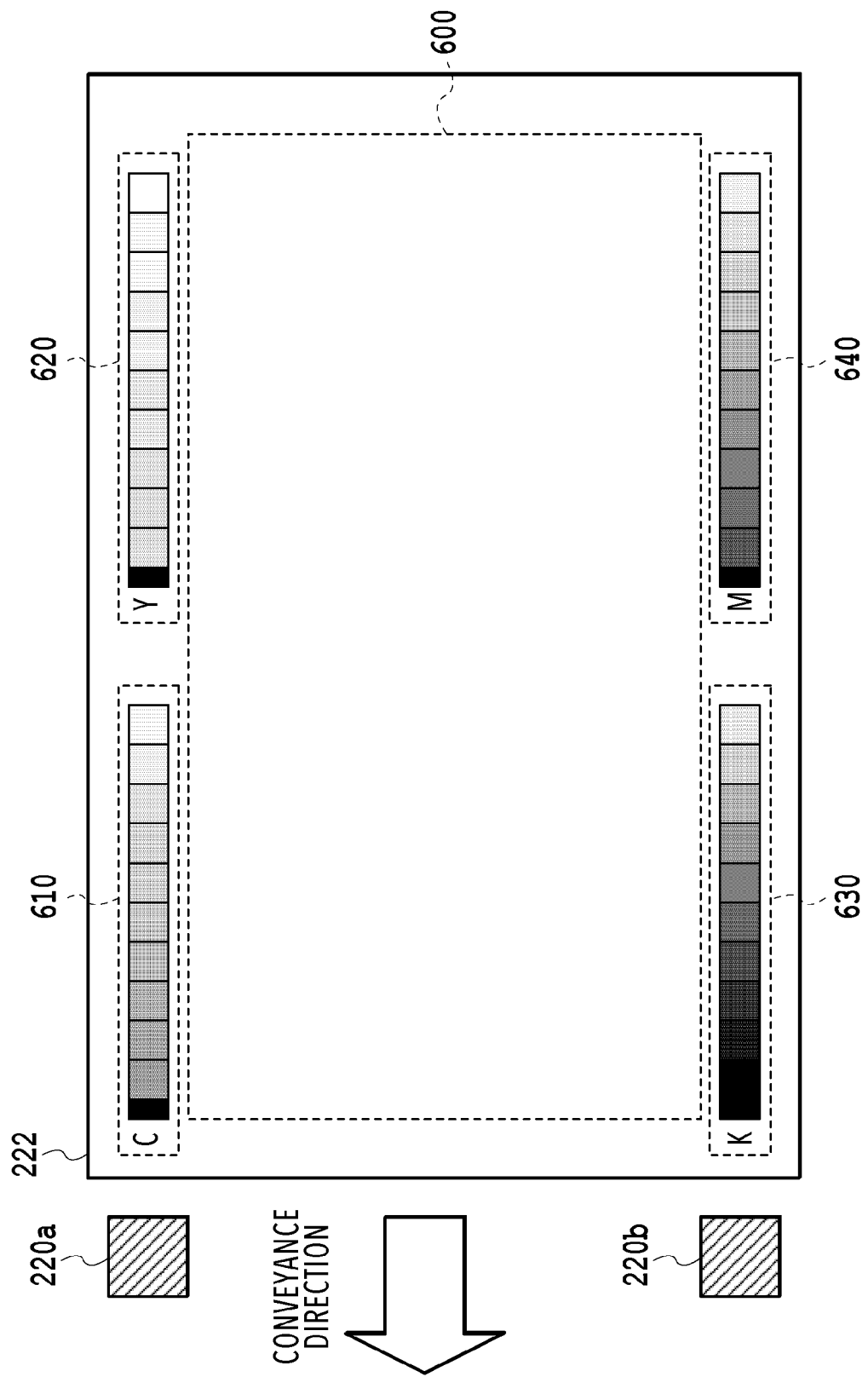

| MEASURED VALUE | | | | | | | | | | |
|---|---|---|---|---|---|---|---|---|---|---|
| DENSITY | 100 | 90 | 80 | 70 | 60 | 50 | 40 | 30 | 20 | 10 |
| C | 1018 | 921 | 822 | 719 | 620 | 520 | 410 | 307 | 203 | 100 |
| M | 1010 | 920 | 815 | 723 | 615 | 523 | 422 | 311 | 214 | 100 |
| Y | 1005 | 923 | 824 | 710 | 619 | 512 | 411 | 309 | 207 | 110 |
| K | 1020 | 915 | 815 | 700 | 601 | 512 | 405 | 302 | 205 | 95 |

FIG.6A

| REFERENCE VALUE (TBL_S01) | | | | | | | | | | |
|---|---|---|---|---|---|---|---|---|---|---|
| DENSITY | 100 | 90 | 80 | 70 | 60 | 50 | 40 | 30 | 20 | 10 |
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

FIG.6B

| CORRECTION VALUE (TBL_C01) | | | | | | | | | | |
|---|---|---|---|---|---|---|---|---|---|---|
| DENSITY | 100 | 90 | 80 | 70 | 60 | 50 | 40 | 30 | 20 | 10 |
| C | 4 | 1 | -3 | -2 | -3 | -8 | 4 | 0 | 2 | 2 |
| M | 10 | 3 | 5 | -6 | 0 | -10 | -10 | -2 | -4 | 3 |
| Y | 11 | -2 | -5 | 7 | -5 | 0 | -1 | -4 | -2 | -11 |
| K | 3 | 5 | 5 | 13 | 10 | -2 | 3 | 5 | 2 | 5 |

FIG.6C

| SHEET NAME | BASIS WEIGHT |
|---|---|
| THIN PAPER 1 | 55 g/m² |
| THIN PAPER 2 | 60 g/m² |
| PLAIN PAPER 1 | 70 g/m² |
| PLAIN PAPER 2 | 80 g/m² |
| PLAIN PAPER 3 | 100 g/m² |
| THICK PAPER 1 | 120 g/m² |
| THICK PAPER 2 | 140 g/m² |
| COATED PAPER 1 | 200 g/m² |
| COATED PAPER 2 | 240 g/m² |
| COATED PAPER 3 | 260 g/m² |

SHEET SETTING

1000

1001

CANCEL   OK

| SHEET TYPE | TARGET FEEDING CASSETTE | REFERENCE VALUE (1/2 (HALF) SPEED) | REFERENCE VALUE (1/1 (FULL) SPEED) | GENERATED PAGE ID | TIMESTAMP |
|---|---|---|---|---|---|
| PLAIN PAPER 3 | CST1 | NULL | EXISTENT TBL_S01 | 30000 | 2019/07/18 10:04:06 |
| PLAIN PAPER 3 | CST2 | NULL | EXISTENT TBL_S01 | 60000 | 2019/07/19 12:08:12 |

FIG.12B

| SHEET TYPE | TARGET FEEDING CASSETTE | REFERENCE VALUE (1/2 (HALF) SPEED) | REFERENCE VALUE (1/1 (FULL) SPEED) | GENERATED PAGE ID | TIMESTAMP |
|---|---|---|---|---|---|
| PLAIN PAPER 3 | CST2 | NULL | EXISTENT TBL_S01 | 60000 | 2019/07/19 12:08:12 |

FIG.12C

| SHEET TYPE | TARGET FEEDING CASSETTE | REFERENCE VALUE (1/2 (HALF) SPEED) | REFERENCE VALUE (1/1 (FULL) SPEED) | GENERATED PAGE ID | TIMESTAMP |
|---|---|---|---|---|---|
| PLAIN PAPER 1 | CST1 | NULL | EXISTENT TBL_S02 | 90000 | 2019/07/20 14:16:24 |
| PLAIN PAPER 3 | CST2 | NULL | EXISTENT TBL_S01 | 60000 | 2019/07/19 12:08:12 |

FIG.13A

| SHEET TYPE | TARGET FEEDING CASSETTE | REFERENCE VALUE (1/2 (HALF) SPEED) | REFERENCE VALUE (1/1 (FULL) SPEED) | GENERATED PAGE ID | TIMESTAMP |
|---|---|---|---|---|---|
| PLAIN PAPER 3 | CST1 | NULL | EXISTENT TBL_C01 | 35000 | 2019/07/18 16:02:03 |
| PLAIN PAPER 3 | CST2 | NULL | EXISTENT TBL_C01 | 65000 | 2019/07/19 18:04:06 |

FIG.13B

| SHEET TYPE | TARGET FEEDING CASSETTE | REFERENCE VALUE (1/2 (HALF) SPEED) | REFERENCE VALUE (1/1 (FULL) SPEED) | GENERATED PAGE ID | TIMESTAMP |
|---|---|---|---|---|---|
| PLAIN PAPER 3 | CST2 | NULL | EXISTENT TBL_C01 | 65000 | 2019/07/19 18:04:06 |

FIG.13C

| SHEET TYPE | TARGET FEEDING CASSETTE | REFERENCE VALUE (1/2 (HALF) SPEED) | REFERENCE VALUE (1/1 (FULL) SPEED) | GENERATED PAGE ID | TIMESTAMP |
|---|---|---|---|---|---|
| PLAIN PAPER 1 | CST1 | NULL | EXISTENT TBL_C02 | 95000 | 2019/07/20 20:18:13 |
| PLAIN PAPER 3 | CST2 | NULL | EXISTENT TBL_C01 | 65000 | 2019/07/19 18:04:06 |

PRINTING APPARATUS, PRINTING CONTROL METHOD, AND STORAGE MEDIUM

This application is a divisional of application Ser. No. 17/179,464, filed Feb. 19, 2021.

BACKGROUND OF THE INVENTION

Field of the Invention

The present disclosure relates to a stabilization technique of a tint at the time of continuous printing.

Description of the Related Art

In a case where a large number of pages are printed, it is required to suppress a tone variation so that the image quality does not change between pages. In this regard, as a technique to perform tone correction real time during processing of a print job, there is a technique to perform tone correction for a subsequent page by reading a tone correction patch printed on a sheet by a color measurement sensor and feeding back the results. According to this technique that feeds back the final printing results, it is possible to expect an accurate suppression effect of the tone variation, but it is known that there occurs a feedback delay in accordance with sheet circulation within a print engine and a conveyance path length up to the color measurement sensor. Then, Japanese Patent Laid-Open No. 2015-225170 has disclosed a technique to manage a density reference value and a density correction value for tone correction for each print job.

Depending on a print application on the side of a host, there is a case where print target data is divided into a plurality of printing requests and sections for which it is desired to suppress the tone variation do not necessarily assemble into one print job. Further, there is a use case where a large number of print jobs having a small number of pages are processed continuously. In these cases, with the method of Japanese Patent Laid-Open No. 2015-225170 described above, the density reference value for suppressing the tone variation is reset for each print job, and therefore, a predetermined number of pages for which the tone correction is not performed occurs each time the print job is changed to another.

The present disclosure has been made in view of the above-described problem and an object is to reduce the occurrence of a feedback delay as much as possible while maintaining the suppression effect of the tone variation in a case where the tone correction is performed real time during the processing of a print job.

SUMMARY OF THE INVENTION

The printing apparatus according to the present disclosure includes: a generating unit configured to generate a page image by performing tone correction for an image of each page, which is obtained by interpreting PDL included in a print job; a combining unit configured to combine a patch for the tone correction with the page image; a printing unit configured to print the page image with which the patch is combined on a sheet; a measuring unit configured to measure density of the patch formed on a sheet by the printing unit; and a first storing unit configured to store a reference value indicating density, which is a reference at the time of the tone correction, in association with a sheet type registered for a feeding cassette, and the generating unit performs the tone correction by using a correction value that is derived based on a density value of a preceding page, which is obtained by the measurement, and the reference value stored by the first storing unit.

Further features of the present invention will become apparent from the following description of exemplary embodiments with reference to the attached drawings.

BRIEF DESCRIPTION OF THE DRAWINGS

FIG. 5 is a diagram schematically showing the way the colors of patches on a sheet are measured;

FIG. 6A is a diagram showing an example of measured value data, FIG. 6B is a diagram showing an example of reference value data, and FIG. 6C is a diagram showing an example of correction values;

FIG. 9 is a diagram showing an example of a sheet setting screen;

FIG. 12A to FIG. 12C are each a diagram showing an example of a reference value management table; and FIG. 13A to FIG. 13C are each a diagram showing an example of a correction value management table.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

[First Embodiment]

<System Configuration>

Figure 1A:
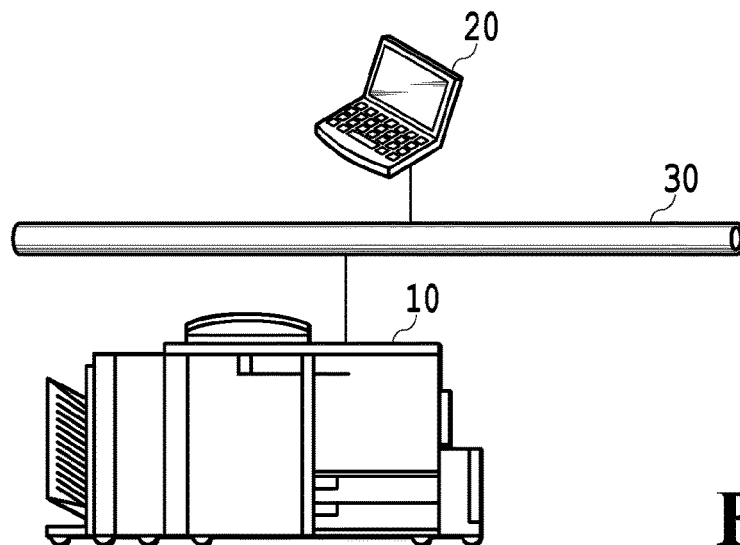
FIG. 1A is a diagram showing an example of a configuration of a printing system and FIG. 1B is a block diagram showing an example of a hardware configuration of a printing apparatus.

FIG. 1A is a diagram showing an example of the configuration of a printing system according to the present embodiment. As shown in FIG. 1A, in the printing system, a printing apparatus 10 and a host PC (information processing apparatus) 20 are connected by a network 30, such as a LAN. The printing apparatus 10 has a function (printing function) to form an image on a printing medium, such as paper and a plastic sheet (hereinafter, called "sheet"), in accordance with a printing request received from the host PC 20. The configuration of the printing system is not limited to that shown in FIG. 1A and may be one in which at least one or more information processing apparatuses and printing apparatuses are connected via the network 30 so as to be capable of printing. Further, the network 30 may be wireless or wired. <Hardware configuration of printing apparatus>

Figure 1B:
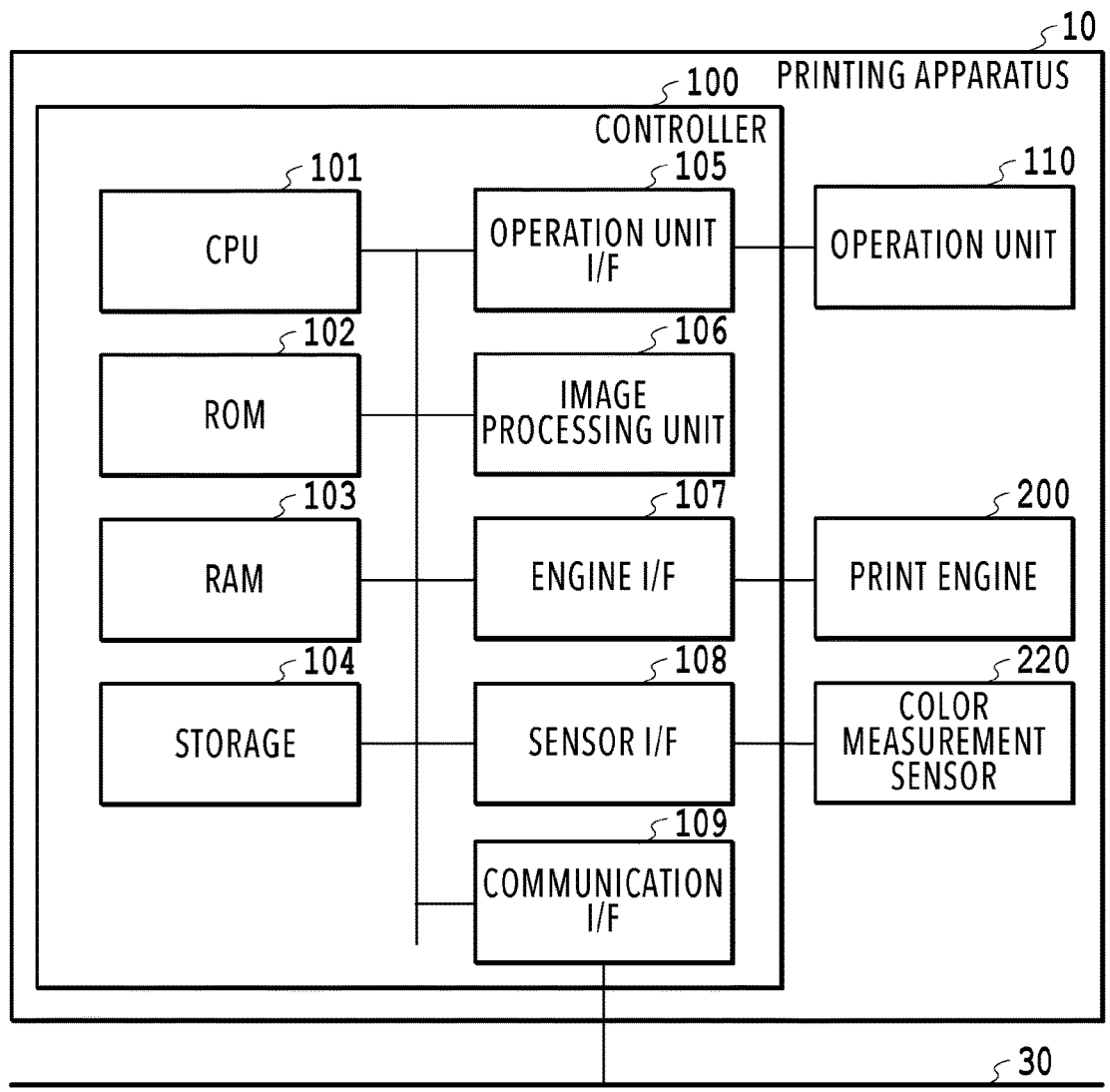

FIG. 1B is a block diagram showing an example of the hardware configuration of the printing apparatus 10 according to the present embodiment. The printing apparatus 10 has a controller 100, an operation unit 110, a print engine 220, and a color measurement sensor 220. The printing apparatus 10 of the present embodiment is explained as an apparatus specialized in printing (Single Function Peripheral), but the application range of the present embodiment is not limited to this. For example, the printing apparatus 10 may be an apparatus (Multi Function Peripheral) comprising a scanner function and a FAX function, in addition to the printing function. In the following, each unit of the hardware comprised by the printing apparatus 10 is explained.

The controller 100 has a CPU 101, a ROM 102, a RAM 103, a storage 104, an operation unit I/F 105, an image processing unit 106, an engine I/F 107, a sensor I/F 108, and a communication I/F 109.

The CPU 101 a central processing unit configured to control the operation of the entire printing apparatus 10. The CPU 101 performs various kinds of control, such as printing control and color measurement control, by loading programs stored in the ROM 102 or the storage 104 onto the RAM 103 and executing the programs. The ROM 102 stores control programs the CPU 101 can execute, the boot program, and the like. The RAM 103 is a main storage memory of the CPU 101 and used as a work area or a temporary storage area for loading various control programs. The storage 104 stores various kinds of image data, various programs, various kinds of setting information and the like. In the present embodiment, as the storage 104, an HDD is supposed, but it may also be possible to use a nonvolatile memory, such as an SSD. In the present embodiment, the one CPU 101 performs each piece of processing shown in flowcharts, to be described later, by using the one memory (RAM 103), but this is not limited. For example, the configuration may be one in which each piece of processing shown in the flowcharts, to be described later, is performed by causing a plurality of CPUs, RAMs, ROMs, and storages to cooperate with one another. Further, it may also be possible to perform part of the processing by using a hardware circuit, such as an ASIC and an FPGA.

The operation unit I/F 105 is an interface that connects the operation unit 110 and the controller 100. The operation unit 110 comprises a display having a touch panel function and various hard keys and functions as a display unit configured to display information and a reception unit configured to receive instructions of a user. The image processing unit 106 comprises a function of a RIP (Raster Image Processor) and generates page image data for printing processing by interpreting PDL data included in a printing request received from the host PC 20 via the communication I/F 109. Further, the image processing unit 106 also performs various kinds of image processing, such as resolution conversion and tone correction, for the generated page image data. In the present embodiment, it is supposed that the image processing unit 106 is implemented by a hardware circuit (ASIC, FPGA or the like), but this is not limited. For example, it may also be possible to implement interpretation of PDL data and various kinds of image processing by separately comprising a processor (GPU) for the purpose of image processing and by the GPU executing image processing programs. In this case, the GPU and the above-described CPU 101 implement the flowcharts, to be described later, in cooperation with each other. Further, it may also be possible to design the configuration so that the CPU 101 performs the image processing programs. Furthermore, it may also be possible to perform the image processing by a combination of some of these.

The engine I/F 107 is an interface that connects the controller 100 and the print engine 200. The print engine 200 prints an image on a sheet fed from a feeding cassette (also called "sheet feeding deck") based on the print image data generated by the image processing unit 106. The printing method of the print engine 200 may be the electrophotographic method or the ink jet method. Further, it is also possible to apply another printing method, such as the thermal transfer method.

The sensor I/F 108 is an interface that connects the controller 100 and the color measurement sensor 220. The color measurement sensor 220 is located on the downstream side of a sheet conveyance path of the print engine 200, measures the color of a tone pattern image formed on the printed sheet, and generates color measurement data. The tone pattern image of the present embodiment includes patch images (hereinafter, simply described as "patch") for tone correction, corresponding to each of CMYK.

The controller 100 is connected to the network 30 via the communication I/F 109. The communication I/F 109 receives a printing request from the host PC on the network 30.

<Details of Print Engine>

Figure 2:
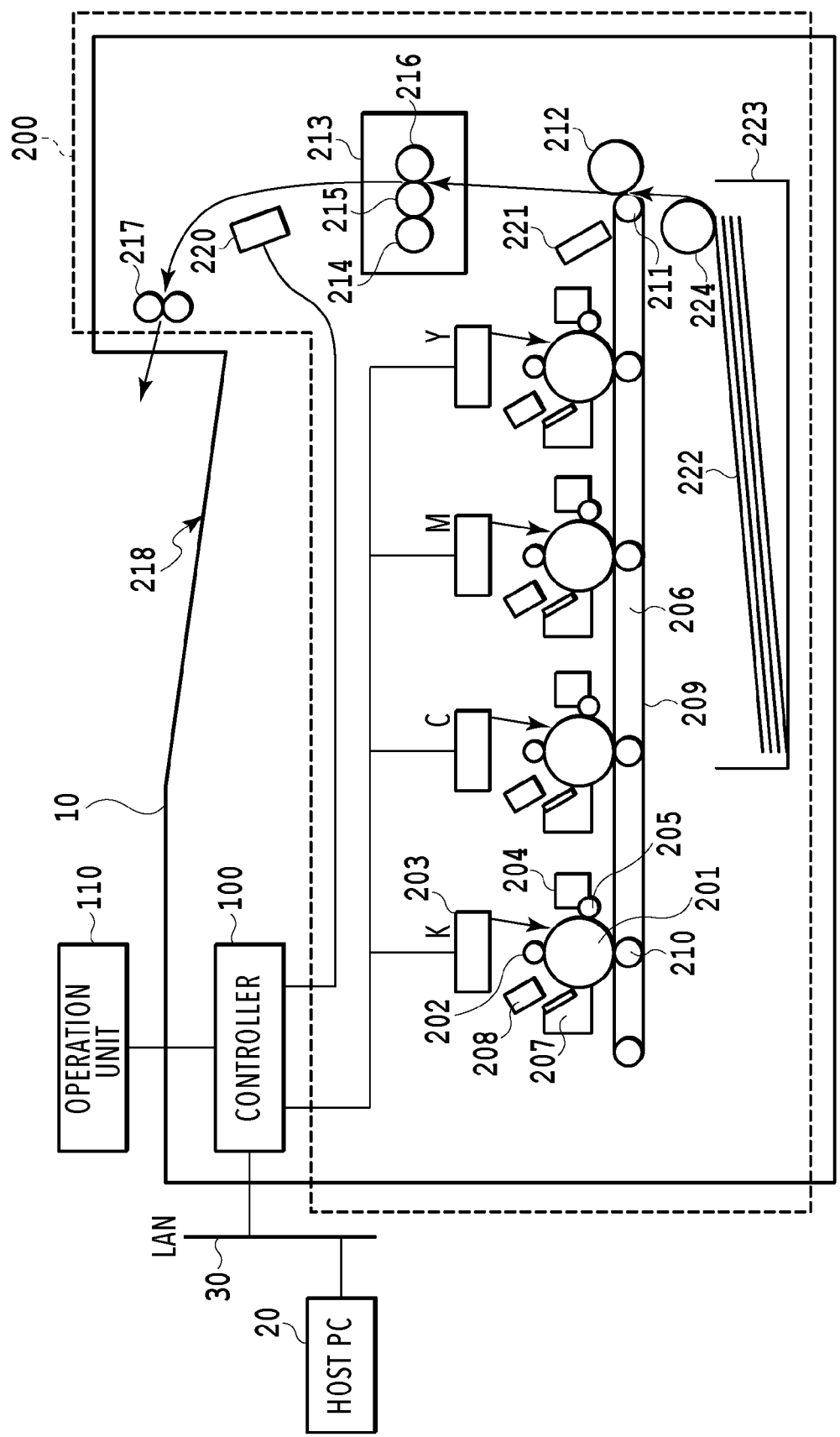
FIG. 2 is a diagram explaining an internal configuration of an electrophotographic print engine.

FIG. 2 is a diagram explaining the internal configuration of the electrophotographic print engine 200. The portion surrounded by a broken line in FIG. 2 indicates the print engine 200. In the print engine 200, four stations corresponding to each of cyan (C), magenta (M), yellow (Y), and black (K) toner exist. By these four stations arranged in the horizontal direction, a toner image is formed sequentially in order of yellow, magenta, cyan, and black.

Each station comprises a photoconductor drum 201 as an image bearing member. On the circumferential surface of the photoconductor drum 201, a charger 202, an exposure device 203, a developing device 204, a cleaning device 207, and a pre-exposer 208 are arranged. In the developing device 204, a developing roller 205 that supplies a developing material (toner) to the photoconductor drum 201 is arranged. In an intermediate transfer unit 206, a primary transfer roller 210 of each station comes into contact with the photoconductor drum 201 in opposition to each other via an intermediate transfer belt 209. Further, a secondary transfer inner roller 211 and a secondary transfer roller 212 also come into contact with each other via the intermediate transfer belt 209 and are arranged in a configuration in which the intermediate transfer belt rotates in the conveyance direction. A fixing device 213 includes a heating film (heating rotator) 214, a fixing roller 215, and a pressure roller 216 and heats toner transferred onto a sheet 222 and fixes the toner by applying a pressure. A discharge roller 217 discharges the sheet 222 having passed through the fixing device 213 to a discharge tray 218. The color measurement sensor 220 is installed between the fixing device 213 and the discharge roller 217 so as to be capable of reading the printed surface and measures the density of the patch formed on the sheet 222 having completed fixing and notifies the controller 100 of the color measurement data (density data). A cleaning blade 221 performs cleaning of the toner having not been transferred onto the sheet 222 at the time of the secondary transfer and remaining on the intermediate transfer belt 209. A feeding roller 224 feeds the sheet 222 stored in a feeding cassette 223. In FIG. 2, the one feeding cassette 223 is shown, but it is assumed that the printing apparatus 10 comprises a plurality of the feeding cassettes 223 corresponding to a variety of sheet sizes and sheet types.

<Software Configuration of Printing Apparatus>

Figure 3:
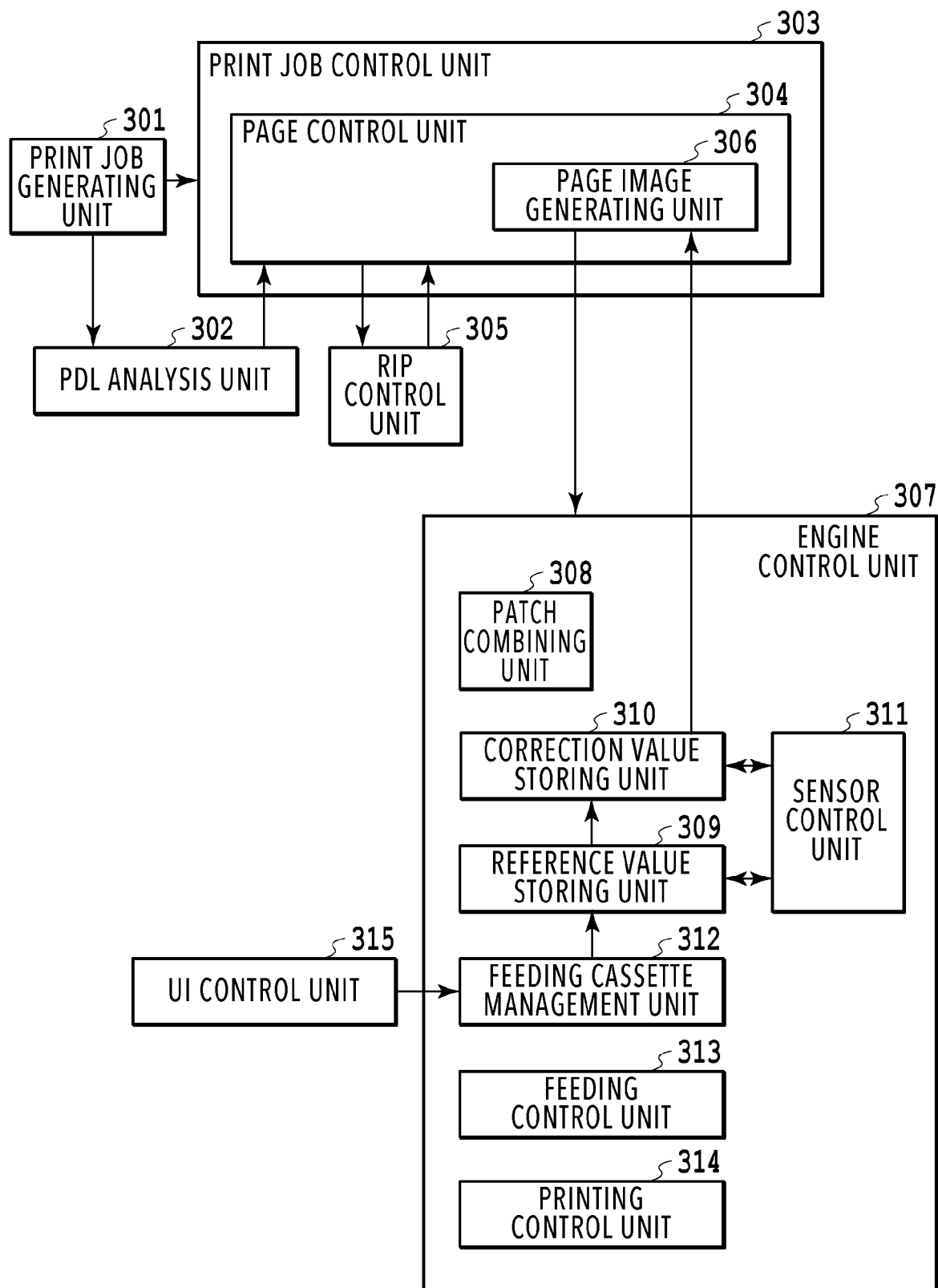
FIG. 3 is a block diagram showing an example of a software configuration of the printing apparatus.
Figure 4B:
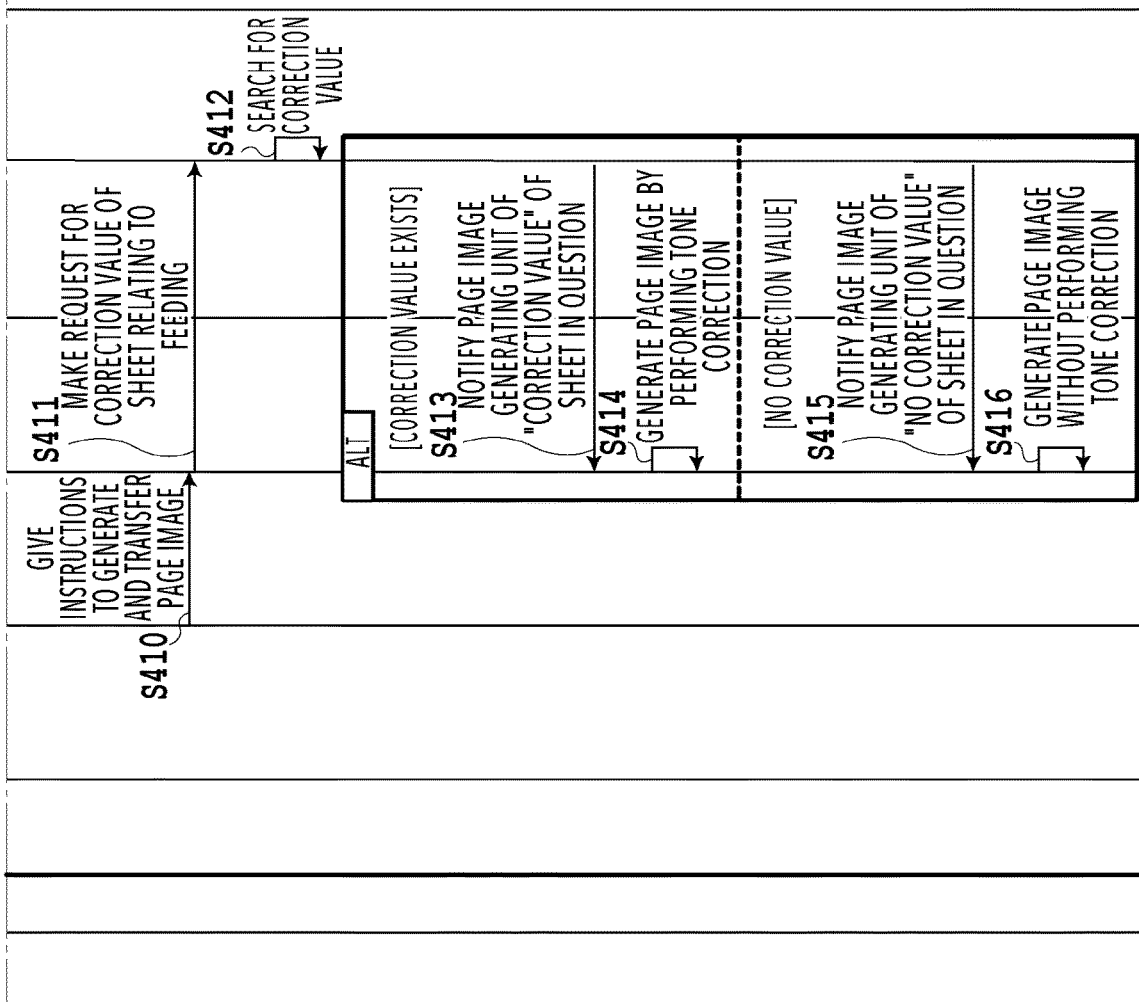
FIG. 4 is a diagram showing a relationship between FIGS. 4A and 4D, and FIGS. 4A to 4D are sequence diagrams showing a flow of printing processing in the printing apparatus.
Figure 4C:
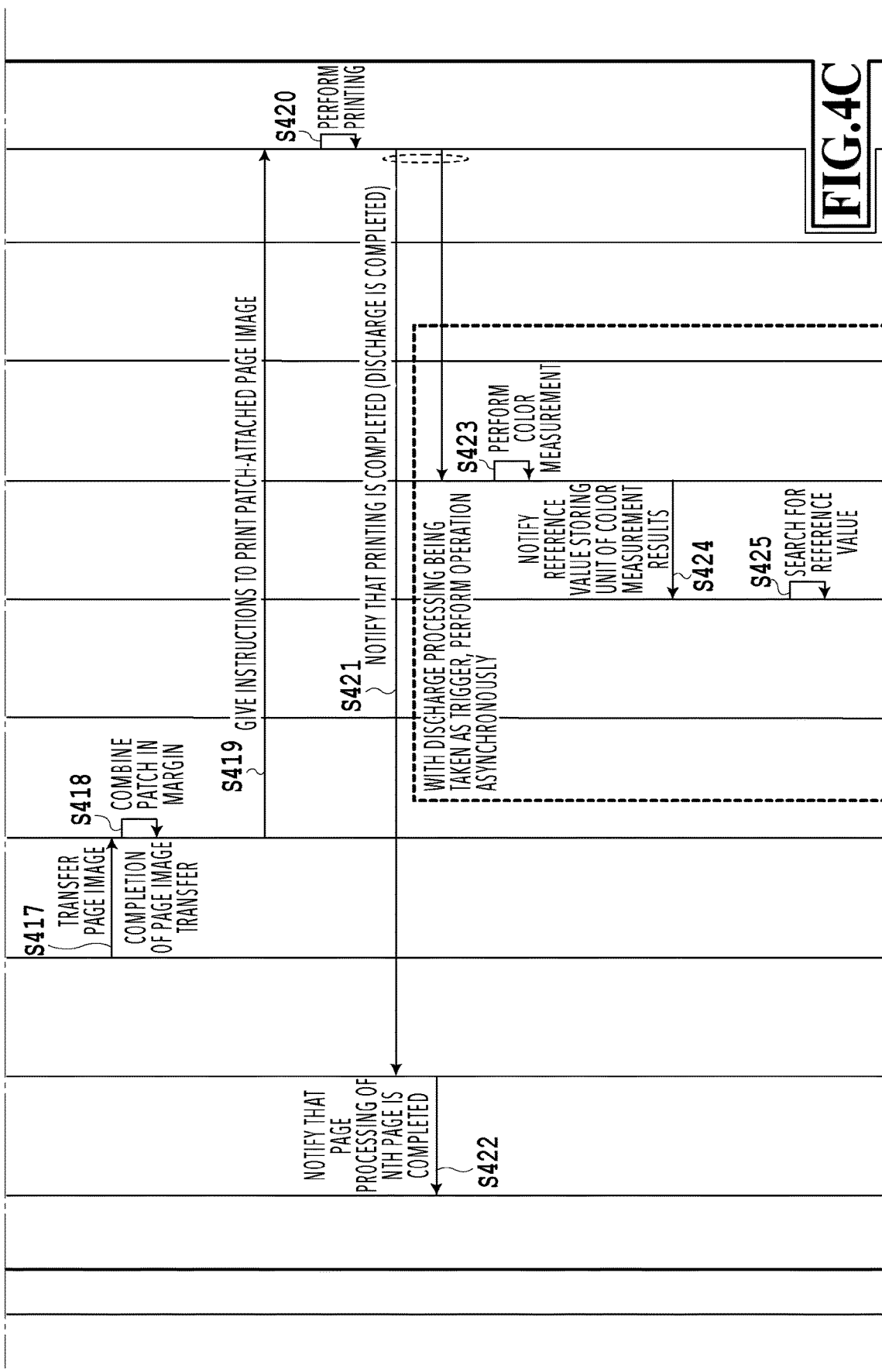
Figure 4D:
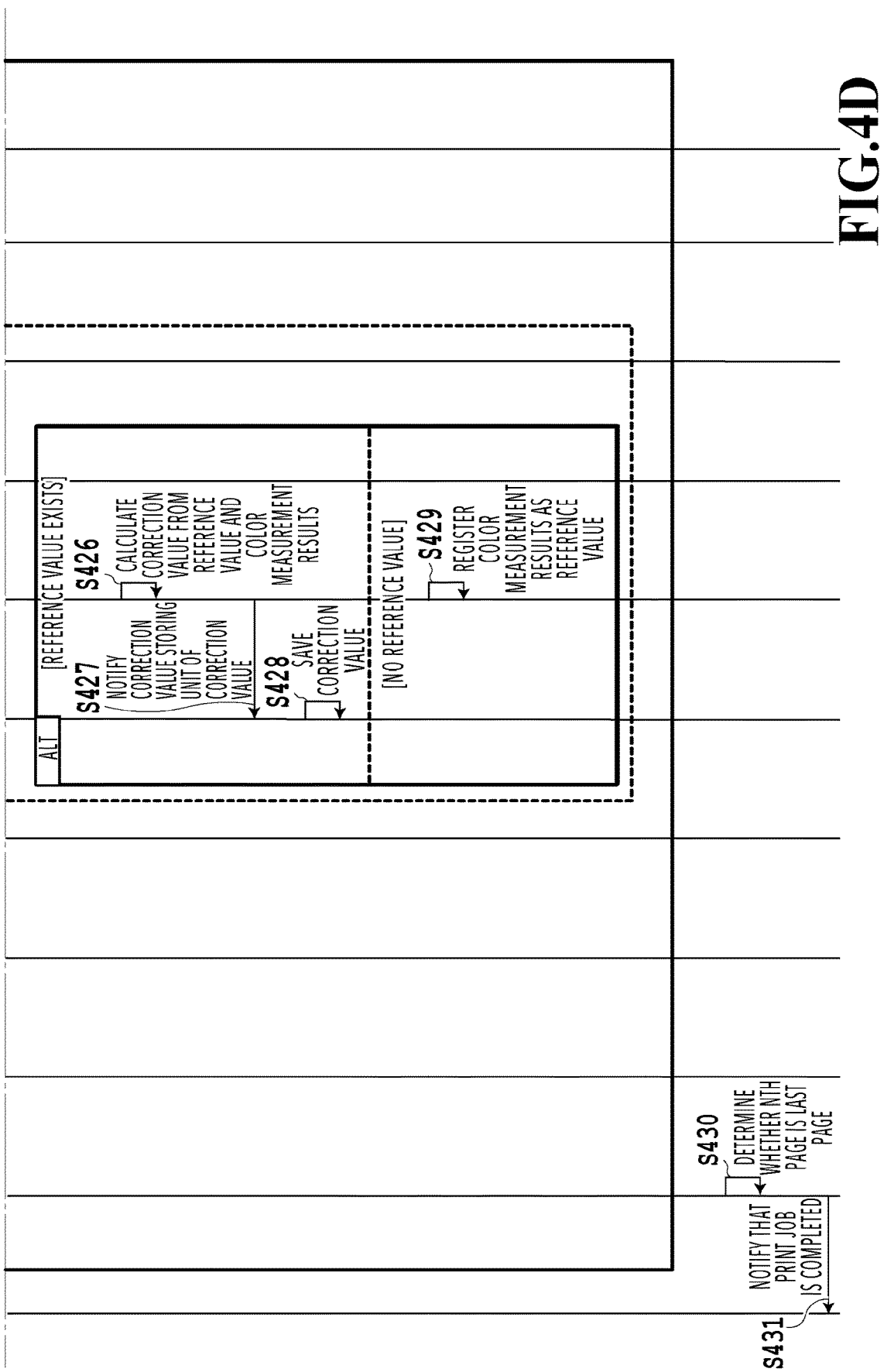

Following the above, the software configuration of the printing apparatus 10 is explained. FIG. 3 is a block diagram showing an example of the software configuration of the printing apparatus 10 according to the present embodiment. The printing request from the host PC 20 is input to a print job generating unit 301 within the printing apparatus 10. Here, in the printing request, in addition to data (PDL data) in which a print target image is described in PDL (Page Description Language), printing setting information specifying conditions at the time of printing (sheet size, sheet type, number of pages, number of printing copies and the like) is included.

The print job generating unit 301 generates a job (print job) for performing printing processing in the print engine 200 based on the input printing request. The generated print job is registered in a print job control unit 303.

The print job control unit 303 instructs a page control unit 304 to start processing in order from the first page for all the printing-target pages included in the registered print job and causes the page control unit 304 to start printing processing (page processing) of each page. Upon receipt of the instructions to start processing from the print job control unit 303, the page control unit 304 performs and controls the page processing of the specified page. Then, in a case of receiving a notification to the effect that it is possible to start processing of the next page from the page control unit 304, the print job control unit 303 instructs the page control unit 304 to start processing of the next page. This is performed for all the pages. Then, in a case of receiving a notification of completion of the page processing of all the pages from the page control unit 304, the print job control unit 303 notifies the print job generating unit 301 of completion of the print job.

A PDL analysis unit 302 analyzes the PDL data included in the printing request received from the host PC20 and converts the PDL data into intermediate data. Then, a RIP control unit 305 rasterizes the intermediate data and converts into image data in the bitmap format for each page.

A page image generating unit 306 generates print image data of each page by performing tone correction processing for the image data of each page in the bitmap format generated in the RIP control unit 305. In the tone correction processing, tone correction data (in the following, described as "correction value") corresponding to the sheet type of the sheet that is used for printing of the page is reflected each time. In the following explanation, the print image of each page is called "page image". The page image data generated in the page image generating unit 306 is sent to an engine control unit 307.

The engine control unit 307 includes a patch combining unit 308, a reference value storing unit 309, a correction value storing unit 310, a sensor control unit 311, a feeding cassette management unit 312, a feeding control unit 313, and a printing control unit 314.

The patch combining unit 308 combines a patch whose tone is made different stepwise for each color of the color materials (recording materials) for the page image received from the page image generating unit 306. The data of the page image (in the following, called "patch-attached page image") to which the patch of each color (here, each color of CMYK) is added by the combining processing is sent to the printing control unit 314. The feeding control unit 313 conveys and supplies the sheet accommodated in the feeding cassette 223 by controlling the feeding cassette 223 in accordance with the sheet size and sheet type designated by the print job.

The printing control unit 314 prints an image on the sheet supplied from the feeding control unit 313 by using the patch-attached page image data and discharges the sheet.

The sensor control unit 311 acquires color measurement data by performing density measurement of the patch formed on the printed sheet by controlling the color measurement sensor 200. The reference value storing unit 309 stores the density reference value (in the following, simply described as "reference value") for tone correction, which is generated based on the color measurement data acquired by the sensor control unit 311, for each kind of sheet (sheet type) accommodated in the feeding cassette 223. The correction value storing unit 310 stores the density correction value (in the following, simply described as "correction value") for tone correction, which is obtained by the comparing the reference value stored by the reference value storing unit 309 and the color measurement data acquired by the sensor control unit 311, for each type of the sheet accommodated in the feeding cassette 223.

The feeding cassette management unit 312 manages information relating to the sheets accommodated in all the feeding cassettes 223 comprised by the printing apparatus 10. Further, the feeding cassette management unit 312 also performs reset control of the reference value stored by the reference value storing unit 309 and the correction value stored by the correction value storing unit 310. In the present embodiment, it is assumed that the information relating to the sheet is managed in a table method and the management table for the above-described reference value and the management table for the above-described correction value are provided, respectively. Details of the management table and details of the reset processing of the reference value and the correction value will be described later. A UI control unit 315 displays a predetermined UI screen on the operation unit 110, makes a request to register the sheet type to the feeding cassette management unit 312, and so on.

<Printing Processing Sequence>

Following the above, processing in the printing apparatus 10 having received the printing request from the host PC 20 is explained. FIGS. 4A to 4D are sequence diagrams showing a flow of the processing in the printing apparatus 10. The series of operation shown in the sequence diagrams in FIGS. 4A to 4D is implemented by the CPU 101 reading a program stored in the ROM 102 onto the RAM 103 and executing the program. Symbol "S" in the explanation of the following sequence diagrams and flowcharts represents a step.

First, the print job generating unit 301 generates a print job based on the printing request from the host PC 20 and registers the print job in the print job control unit 303 (S401). In response to the registration of the print job, the print job control unit 303 determines the execution order of the registered print jobs and starts processing in accordance with the determined order (S402). S403 to S429 that follow are repeated the number of times corresponding to the number of pages designated by the processing-target pint job.

The print job control unit 303 instructs the page control unit 304 to start processing of a target page (Nth page) in the target print job (S403). Upon receipt of the instructions, the page control unit 304 makes an inquiry about from which feeding cassette the sheet of the sheet size and sheet type designated for the Nth page is fed to the feeding cassette management unit 312 (S404). The feeding cassette management unit 312 determines from which feeding cassette to feed the sheet from the information on the sheet size and the sheet type designated for the Nth page and returns the results to the page control unit 304 (S405).

The page control unit 304 having received the information on the feeding cassette that is used from the feeding cassette management unit 312 instructs the feeding control unit 313 to feed the sheet from the feeding cassette that is identified by the information (S406). The feeding control unit 313 feeds the sheet from the feeding cassette determined by the feeding cassette management unit 312 in accordance with the feeding instructions from the page control unit 304 (S407) and returns the feeding results to the page control unit 304 (S408). In a case where the feeding results from the feeding control unit 313 indicate "normal", the page control unit 304 notifies the print job control unit 303 that it is made possible to start the processing of the next page (S409), Further, upon receipt of the feeding results of "normal", the page control unit 304 instructs the page image generating unit 306 to generate and transfer a page image (S410). At this time, page image generating unit 306 is also notified of the information on the feeding cassette from which the sheet has been fed, the sheet size, and the sheet type.

Upon receipt of the instructions to generate and transfer a page image, the page image generating unit 306 makes a request for the correction value corresponding to the sheet type relating to the feeding to the correction value storing unit 310 based on the notified information (S411). The correction value storing unit 310 searches whether the correction value corresponding to the sheet type relating to the feeding is stored in the RAM 103 (S412). In a case where the correction value in question is found as a result of the search, the correction value storing unit 310 notifies the page image generating unit 306 of the found correction value (S413). In this case, the page image generating unit 306 generates a page image by performing the tone correction processing using the notified correction value (S414). On the other hand, in a case where the correction value in question is not found as a result of the search at S412, the correction value storing unit 310 notifies the page image generating unit 306 that the correction value in question does not exist (S415). In this case, the page image generating unit 306 generates a page image without performing the tone correction processing (S416). Then, the page image generating unit 306 transfers the generated page image data of the Nth page to the patch combining unit 308 along with the information (in the following, called "feeding information") relating to the sheet fed at S407. In this case, in the feeding information, information on the sheet size and sheet type of the sheet, the feeding cassette accommodating the sheet, and the like is included.

The patch combining unit 308 generates a patch-attached page image in the margin of the page image received from the page image generating unit 306 by combining the above-described patch of each color (S418). Next, the patch combining unit 308 transmits the generated patch-attached page image data to the printing control unit 314 along with the above-described feeding information and gives instructions to perform printing (S419). Upon receipt of the instructions to perform printing, the printing control unit 314 performs printing on the sheet supplied from the feeding control unit 313 in accordance with the received patch-attached page image data (S420). In a case where printing is completed, the printing control unit 314 notifies the page control unit 304 and the sensor control unit 311 of completion of printing (completion of discharge) (S421). To this notification of completion of printing (completion of discharge), the above-described feeding information is attached. The page control unit 304 having received the notification of completion of printing (completion of discharge) notifies the print job control unit 303 of completion of the processing of the Nth page (S422). On the other hand, the sensor control unit 311 similarly having received the notification of completion of printing (completion of discharge) measures the density of the patch formed on the sheet by the printing at S420 by using the color measurement sensor 220 (S423). FIG. 5 is a diagram schematically showing the way the color of the patch is measured. In the example in FIG. 5, tone pattern images consist of a plurality of color patches for each of CMYK for real-time tone correction and are printed in the margin area inside the sheet 222 and outside a printing-guaranteed area 600 in the direction parallel to the conveyance direction so that their positions are aligned with the positions of the two color measurement sensors 220a and 220b. The printing-guaranteed area 600 is the portion that will be the final product and the area that guarantees the print quality of the target image designated by a print job. On the other hand, the portion outside the printing-guaranteed area 600 is the area in part of which it is possible to form an image but which is premised not to be used as the final product but cut off or removed. In a so-called POD (Print on Demand) printing apparatus, the area is used for printing of various patches necessary for image quality adjustment and information necessary for product inspection. As shown in FIG. 5, each of patches 610, 620, 630, and 640 for each of CMYK includes 10 sub patches whose density is varied at intervals of 10%. For example, in the color patch 610 of cyan, the density of the leftmost sub patch is 100% and the density decreases at intervals of 10% in the rightward direction and the density of the rightmost sub patch is 10%. Similarly, each patch of magenta, yellow, and black also has the patch configuration in which ten sub patches form one set and the patch density of each color is read by the color measurement sensors 220a and 220b. The sensor control unit 311 notifies the reference value storing unit 309 of the color measurement results of each color of CMYK thus obtained in association with the above-described feeding information (S424). FIG. 6A shows an example of the measured value data (density value data) obtained by expressing the patch density in numbers at 1,024 levels. As described previously, on the sheet 222, the four kinds of patch of each of CMYK are printed and each patch includes ten sub patches, and therefore, as shown in FIG. 6A, a total of 40 measured values are obtained. It is assumed that a value obtained by applying an offset to the value read by the color measurement sensor 220 in view of the characteristic of the color measurement sensor 220 and the white reference value or the like of the sheet is also handled here as the measured value (density value).

The reference value storing unit 309 having received the notification of the color measurement results searches whether the reference value corresponding to the sheet type specified by the feeding information attached to the notification is stored (S425). In a case where the reference value is found, the reference value storing unit 309 calculates a correction value based on the found reference value and the notified color measurement results as described above (S426). Then, the reference value storing unit 309 notifies the correction value storing unit 310 of the calculated correction value (S427). The correction value storing unit 310 having received the notification stores the correction value relating to the notification in the RAM 103 in association with the sheet type specified by the sheet information (S428). On the other hand, in a case where the reference value is not found at S425, the reference value storing unit 309 stores the color measurement results notified by the sensor control unit 311 in the RAM 103 as a new reference value in association with the sheet type specified by the feeding information (S429). That is, the density value obtained by measuring the patch formed on a sheet relating to the first feeding after a new sheet is accommodated in a case where exchange of sheets or the like is performed for a certain feeing cassette is stored as a new reference value in association with the sheet type thereof.

S424 to S428 are summarized as follows. In a case where the color measurement results notified by the sensor control unit 311 are those of the sheet type not registered yet, the reference value storing unit 309 stores the measured value obtained by the color measurement as a new "reference value" in association with the sheet type thereof. On the other hand, in a case where the color measurement results notified by the sensor control unit 311 are those of the sheet type already registered, the correction value is calculated from the measurement results. Specifically, a difference between the reference value associated with the already-registered sheet type and the measured value relating to the notification is found and the difference is taken as the correction value. It may also be possible to take the obtained difference as the correction value as it is, or take a value obtained by performing predetermined modification, such as multiplying a constant or performing threshold value determination and changing a value exceeding a threshold value into a value less than or equal to the threshold value, as the correction value. The correction value thus obtained is delivered to the correction value storing unit 310 and stored therein. FIG. 6B and FIG. 6C respectively show an example of reference value data and an example of correction value data, both stored in a table format in the reference value storing unit 309 and the correction value storing unit 310, respectively. To each table, an ID for identification (here, "TBL_S01", "TBL_C01") is attached so that it is made possible to refer to them in a management table, to be described later. In the present embodiment, the value derived based on the measured value of the preceding page and the reference value is stored as the correction value for the next page, but this is not limited. For example, it may also be possible to design a configuration in which the correction value is obtained by storing in advance the measured value for derivation of the correction value of the next page and finding a difference between the stored measured value of the preceding page and the reference value each time in the processing of the next page.

Here, each piece of processing at S403 to S429 is described in a loop in FIGS. 4A to 4D and this means that each piece of processing at S403 to S429 is performed for all the pages of the print job registered in the print job control unit 303. Further, it is made possible to issue instructions to start processing for the Nth page shown at S403 in a case where a next page processing start possible notification at S409 is received. In a case of receiving the Nth page processing completion notification (S422), the print job control unit 303 determines whether the Nth page is the last page of the target print job (S430). In a case where the determination results indicate that the Nth page is the last page, the print job control unit 303 notifies the print job generating unit 301 of completion of the target print job (S431).

The above is the contents of the basic operation of the processing in the printing apparatus 10 according to the present embodiment.

<Sheet Exchange Sequence>

Figure 7:
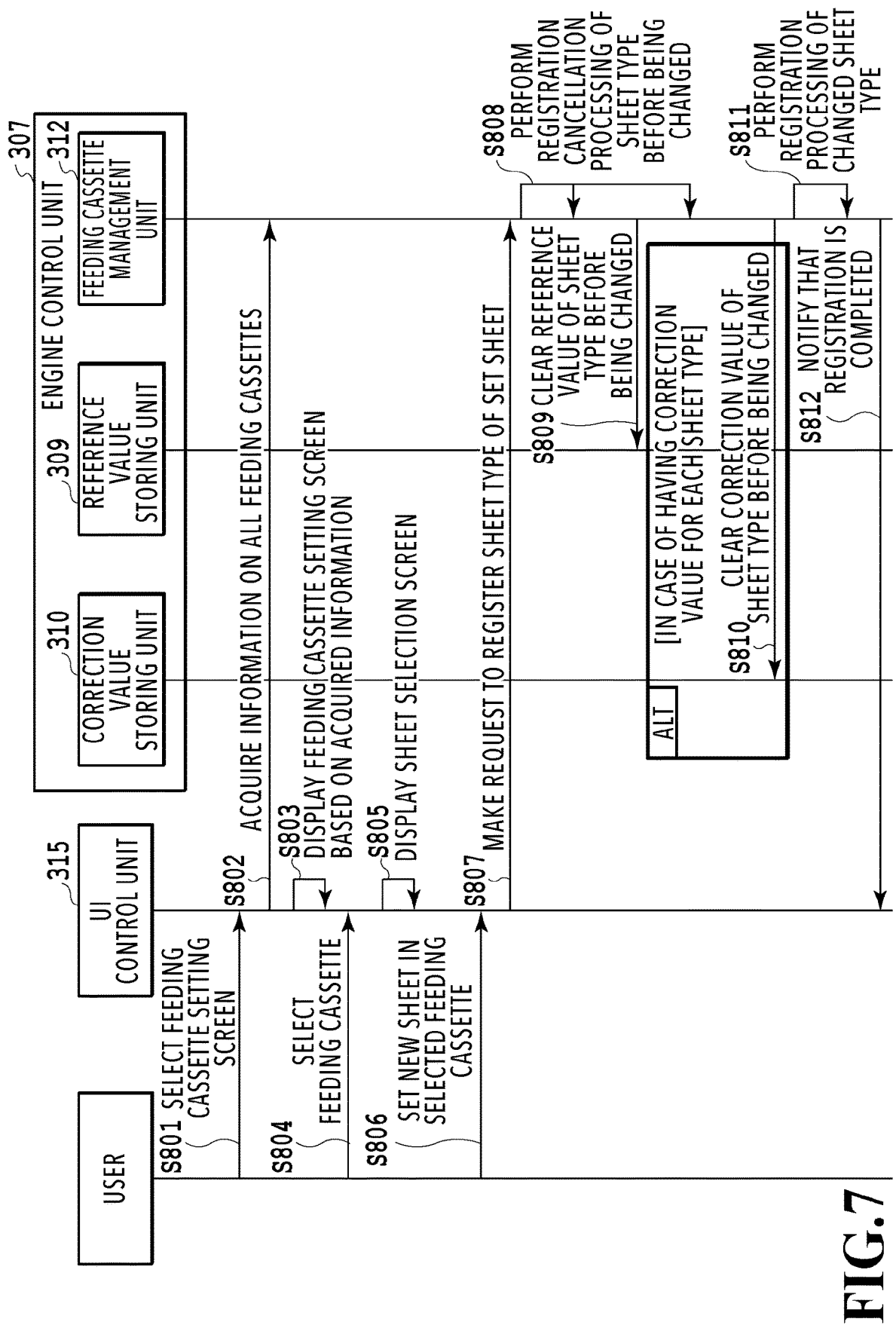
FIG. 7 is a sequence diagram showing a flow of processing at the time of sheet exchange.

Following the above, a flow of processing in a case where sheets that are accommodated in the feeding cassette are exchanged is explained. FIG. 7 is a sequence diagram showing a flow of processing at the time of sheet exchange. Each operation in the printing apparatus 10 among the series of operation shown in the sequence diagram in FIG. 7 is implemented by the CPU 101 reading a program stored in the ROM 102 onto the RAM 103 and executing the program.

The characteristic is different for different sheet types, and therefore, it is necessary to store the above-described reference value for each sheet type in order for the printing apparatus 10 to perform tone correction correctly. Generally, the printing apparatus is designed so as to be capable of adapting to many sheet types, but the sheet that is used actually at the time of printing is the sheet accommodated in the feeing cassette. The reference value storing unit 309 of the present embodiment stores only the reference value corresponding to the sheet type of the sheet actually accommodated in the feeding cassette 223. Consequently, in a case where the sheet type of the sheet that is accommodated in the feeding cassette 223 is changed, the reference value is reset. Specifically, the reference value corresponding to the sheet type (for example, plain paper) of the sheet that is removed is cleared and the reference value corresponding to the sheet type (for example, coated paper) of the sheet that is set newly is set. In the following, along the sequence diagram in FIG. 7, the specific operation is explained.

Figure 8A:
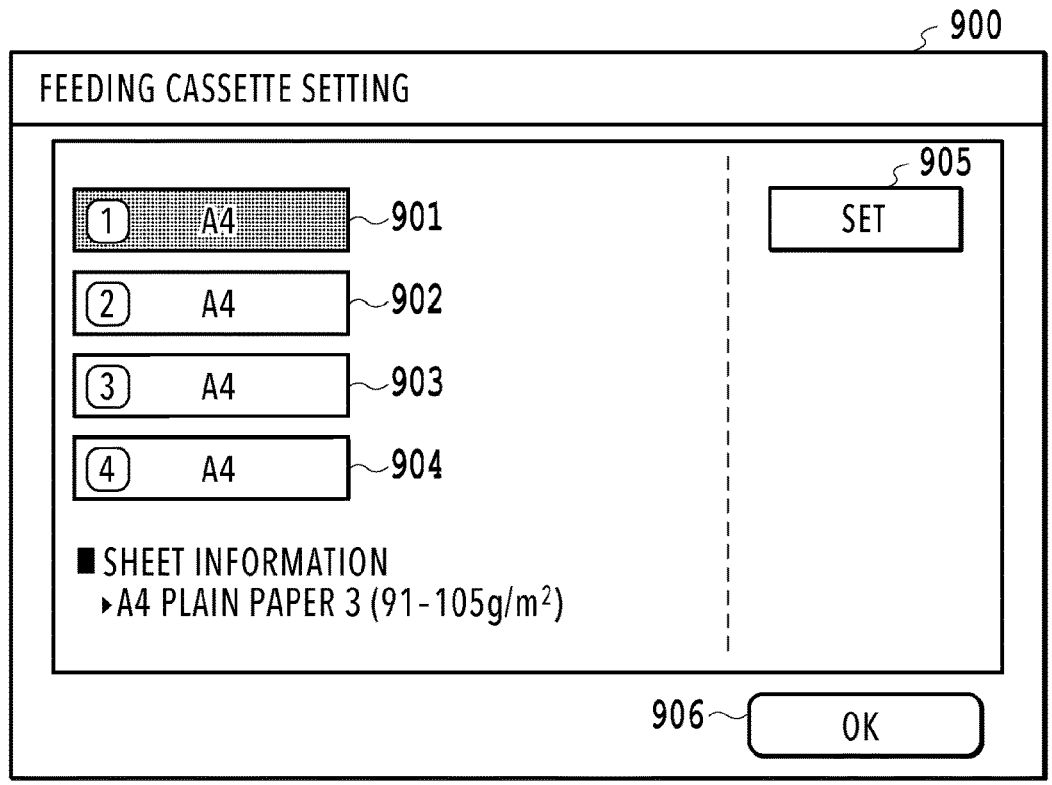
FIG. 8A and FIG. 8B are each a diagram showing an example of a feeding cassette setting screen.

First, a user operates a main screen (not shown schematically) of the operation unit 110 of the printing apparatus 10 and selects a feeding cassette setting screen, which is a UI screen for setting a sheet to the feeding cassette (S801). Then, the UI control unit 315 acquires information (information on sheet size and sheet type of each feeding cassette) relating to the sheets that are set to all the feeding cassettes comprised by the printing apparatus 10 from the feeding cassette management unit 312 (S802). Then, the UI control unit 315 displays the feeding cassette setting screen on the operation unit 110 by using the information acquired at S802 (S803). FIG. 8A shows an example of the feeding cassette setting screen.

Figure 8B:
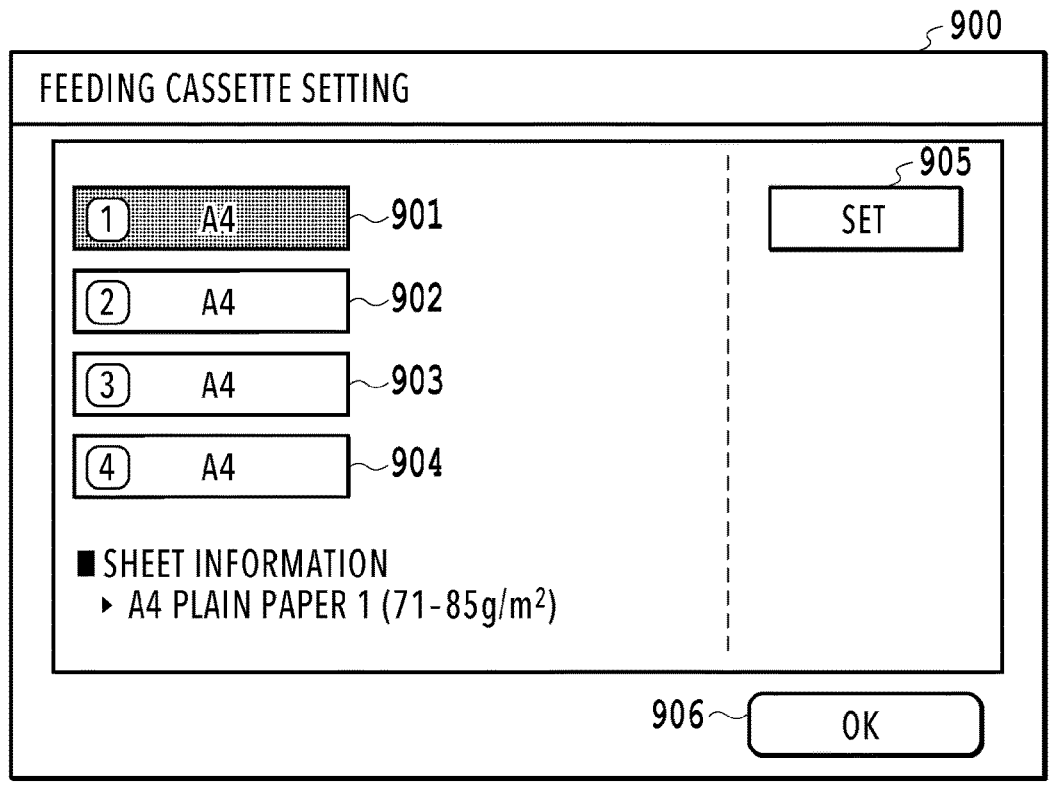

Next, the user selects a feeding cassette that the user desires to replenish with a sheet or whose sheet the user desires to change from among buttons 901 to 904 corresponding to each feeding cassette displayed on a Feeding cassette setting screen 900 (S804). FIG. 8A shows the state where the button 901 corresponding to [feeding cassette 1] is selected and as information indicating the sheet size and the sheet type registered for the [feeding cassette 1] being selected, [A4 plain paper 3] is displayed. In a case where the user presses down a "Set" button 905 in this state, the UI control unit 315 switches the UI display on the operation unit 110 from the Feeding cassette setting screen 900 to a Sheet setting screen 1000 as shown in FIG. 9 (S805). Then, the user sets a desired sheet (here, sheet whose sheet type is [plain paper 1]) in the feeding cassette selected at S804 and selects the sheet type of the sheet that is newly set on the Sheet setting screen 1000 displayed on the operation unit 110 (S806). FIG. 9 shows the state where [plain paper 1] is selected. Then, in a case where the user presses down an "OK" button 1001, the UI control unit 315 updates the display contents as well as returning the UI display on the operation unit 110 from the Sheet setting screen 1000 to the Feeding cassette screen 900. FIG. 8B shows the state of the updated Feeding cassette screen 900. As information indicating the sheet size and the sheet type newly selected for [feeding cassette 1], [A4 plain paper 1] is displayed. In a case where the user having confirmed that the sheet type is changed presses down an "OK" button 906, the UI control unit 315 requests the feeding cassette management unit 312 to register the feeding cassette selected by the user at S804 and the sheet type selected by the user at S806 (S807).

The feeding cassette management unit 312 checks whether or not the sheet type relating to the registration request is, 1) different from the sheet type of the sheet removed from the target feeding cassette, and 2) registered as the sheet type that is used in another feeding cassette other than the target feeding cassette (S808). Then in a case where the sheet type relating to the registration request is different from the sheet type of the removed sheet and is the sheet type not registered for another feeding cassette, the feeding cassette management unit 312 clears the reference value corresponding to the sheet type of the removed sheet (S809). Further, the feeding cassette management unit 312 checks whether the correction value corresponding to the sheet type of the removed sheet is stored in the correction value storing unit 310 and clears the correction value in a case where the correction value is stored (S810). Then, after the series of registration cancellation processing is completed, the feeding cassette management unit 312 performs registration processing of the sheet type of the sheet newly set by the user (S811). In a case where the registration is completed, the feeding cassette management unit 312 notifies the UI control unit 315 of registration completion (S812).

<Reset of Reference Value and Correction Value>

Next, details of the reset processing (S808 to S811) of the reference value and the correction value in the feeding cassette management unit 312, which accompanies the change of the type of the sheet accommodated in the feeding cassette, are explained for each separate case. A first case is a case where the reference value and the correction value are managed collectively for each sheet type. A second case is a case where the reference value and the correction value are managed individually for each feeding cassette. In the following, with reference to the flowcharts (FIG. 10 and FIG. 11) corresponding to each case, the reset processing of the reference value and the correction value is explained in detail.

<<Case 1: Collective Management>>

Figure 10:
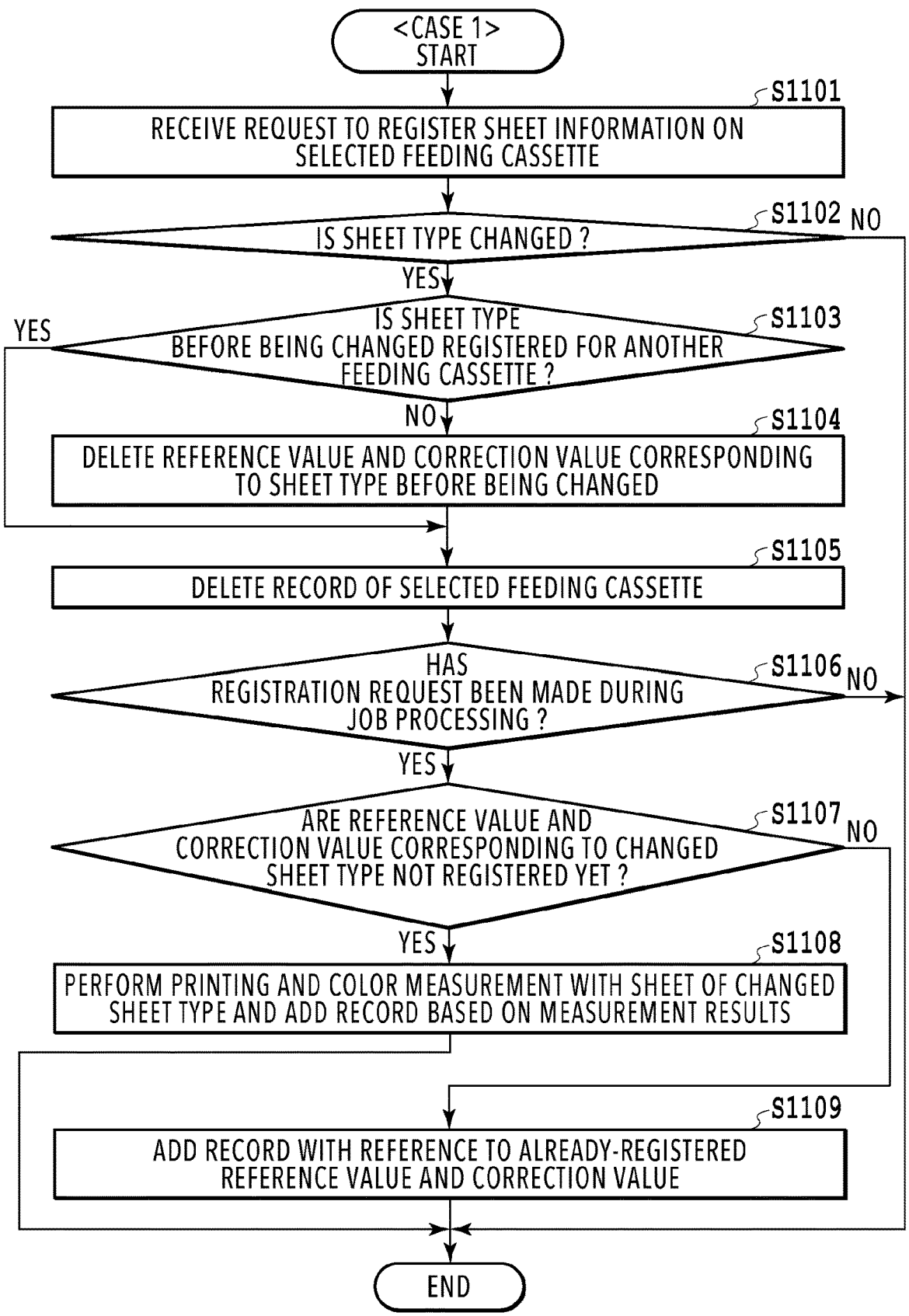
FIG. 10 is a flowchart showing a flow of processing of reference value and correction value collective management.

Processing to collectively manage the reference value and the correction value of the sheet type in a case where the same sheet type is set to a plurality of feeding cassettes is explained in detail with reference to the flowchart shown in FIG. 10.

At S1101, a request to register sheet information on the feeding cassette relating to user selection (in the following, called "selected feeding cassette") is received from the UI control unit 315. This registration request includes information (cassette ID and the like) capable of specifying the selected feeding cassette and information indicating the sheet size and the sheet type of the sheet that is set in the selected feeding cassette by a user. In a case where the change of the sheet type is not entailed (in a case where the sheet of the same sheet type is replenished), normally, a user does not perform the setting or the like of the sheet type by opening the Feeding cassette setting screen 900. In this case, in response to the opening/closing operation of the feeding cassette and pressing down of a check button (not shown schematically) of sheet replenishment, a reregistration request for the same sheet type is issued.

At S1102 that follows, whether or not the contents of the registration request received at S1101 entail the change of the sheet type is determined. In a case where the change of the sheet type is not entailed (that is, in a case of reregistration of the same sheet type), this processing is terminated. On the other hand, in a case where the change of the sheet type is entailed, the processing advances to S1103.

At S1103, whether or not the same sheet type as the sheet type before being changed, which is currently registered for the selected feeding cassette, is registered for another feeding cassette is determined. In a case where the same sheet type as the sheet type before being changed is registered for another feeding cassette, the processing advances to S1105. On the other hand, in a case where the same sheet type as the sheet type before being changed is not registered for another feeding cassette (that is, in a case where the sheet type before being changed is no longer used in all the feeding cassettes comprised by the printing apparatus 10), the processing advances to S1104.

At S1104, the reference value storing unit 309 and the correction value storing unit 310 are each instructed to delete the reference value and the correction value corresponding to the sheet type before being changed. Upon receipt of the instructions, the reference value storing unit 309 and the correction value storing unit 310 delete the data of the reference value and the correction value (see FIG. 6B and FIG. 6C described previously) stored in association with the sheet type before being changed, respectively. After the deletion processing is completed, the processing advances to S1105.

At S1105, the record of the sheet information relating to the selected feeding cassette is deleted in each of the management table for the reference value and the management table for the correction value. FIG. 12A shows the state of the management table for the reference value (in the following, described as "reference value management table") before the target record is deleted and FIG. 12B shows the state after the target record is deleted. In the record of each row of the reference value management table, items of "Sheet type", "Target feeding cassette", "Reference value (½ (half) speed)", "Reference value (1/1 (full) speed)", "Generated PageID", and "Timestamp" exist. Here, in the reference value management table shown in FIG. 12A, the record indicating that the sheet type [plain paper 3] is registered for both two feeding cassettes [CST1] and [CST2] exists. For example, the record of [CST1] indicates that printing is performed on the sheets of [30000] pages (on the sheet of [30000th] page) of [plain paper 3], which is the accumulated number from the time at which the electric power source was turned on at [2019/07/18 10:04:06], and the measured value obtained by performing color measurement for the printing results is registered as the reference value. Further, FIG. 13A shows the state of the management table for the correction value (in the following, described as "correction value management table") before the target record is deleted and FIG. 13B shows the state after the target record is deleted. In the record of each row of the correction value management table, items of "Sheet type", "Target feeding cassette", "Correction value (½ (half) speed)", "Correction value (1/1 (full) speed)", "Generated PageID", and "Timestamp" exist. The basic configuration of the record of the correction value management table is the same as that of the record of the reference value management table except only that "Reference value" is replaced with "Correction value". Then, for example, in a case where the sheet of [plain paper 3] is removed from [CST1] and the sheet type is changed to another sheet type (for example, [plain paper 1], the reference value management table and the correction value management table will be those as in FIG. 12B and FIG. 13B, respectively. That is, from both the reference value management table and the correction value management table, the record of [CST1] is deleted.

At S1106, whether or not the registration request received at S1101 has been made during the job processing is determined. In a case where the determination results indicates that the request has been received during the job processing, the processing advances to S1107 and in a case where the request has not been received during the job processing, this processing is terminated.

At S1107, whether or not the reference value and the correction value corresponding to the changed sheet type relating to the registration request are registered, that is, whether or not the same sheet type is set to another feeding cassette, is determined. In a case where the determination results indicate that the reference value and the correction value corresponding to the changed sheet type are not registered yet, the processing advances to S1108 and in a case where they are already registered, the processing advances to S1109.

At S1108, the color measurement is performed for the output results of the print job whose processing has been resumed after the sheet exchange and based on the obtained measured value, a new record including information on the changed sheet type for the selected feeding cassette is added to the reference value management table and the correction value management table. At this time, first, the reference value data corresponding to the changed sheet type relating to the registration request is generated and registered newly in the reference value storing unit 309 based on the printing results of the printed page immediately after the resumption and link processing is performed so that the reference value data is referred to. After that, the correction value data corresponding to the changed sheet type is generated and registered newly in the correction value storing unit 310 based on the printing results of the subsequent page and link processing is performed so that the correction value data is referred to. FIG. 12C and FIG. 13C show the reference value management table and the correction value management table, respectively, in the state where a new record is added in a case where the sheet type of [CST1] is changed from [plain paper 3] to [plain paper 1]. On the other hand, at S1109, a record including information on the selected feeding cassette and the changed sheet type is added to the reference value management table. The record that is added at this time is a record for which link processing has been performed so that the already-registered reference value data and correction value data corresponding to the same sheet type as the changed sheet type are referred to. In a case where the registration processing at S1108 or S1109 is completed, this processing is terminated.

<<Case 2: Individual Management>>

Figure 11:
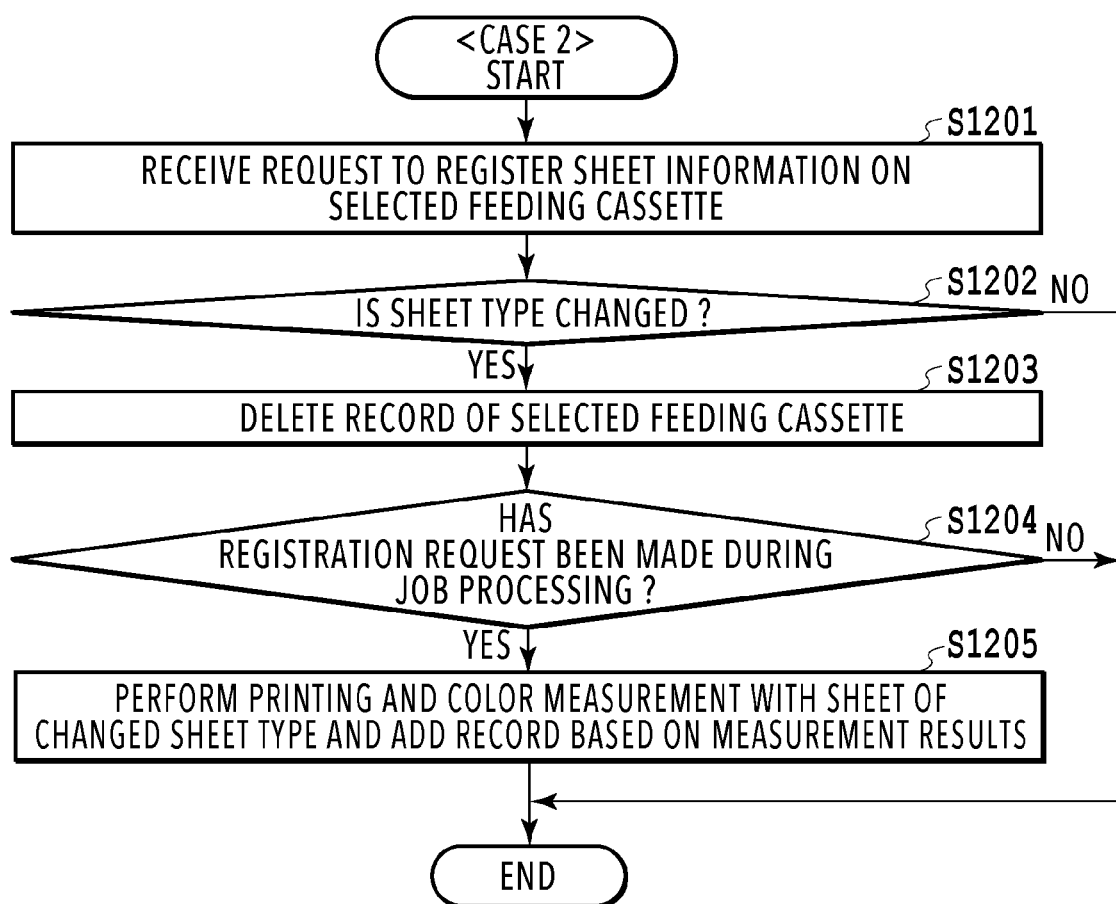
FIG. 11 is a flowchart showing a flow of processing of reference value and correction value individual management.

Next, processing to individually manage the reference value and the correction value for each feeding cassette even in a case where the same sheet type is set to a plurality of feeding cassettes is explained in detail with reference to the flowchart shown in FIG. 11. Explanation of the portion in common to that of the flowchart in FIG. 10 is omitted and in the following, different points are explained mainly.

At S1201, as at S1101, a request to register sheet information on the selected feeding cassette is received from the UI control unit 315. At S1202 that follows, as at S1102, whether or not the contents of the registration request received at S1201 entail the change of the sheet type is determined. In a case where the change of the sheet type is not entailed, this processing is terminated. On the other hand, in a case where the change of the sheet type is entailed, the processing advances to S1203.

At S1203, as at S1105, in both the management tables for the reference value and the correction value, the record of the sheet information relating to the selected feeding cassette is deleted. At S1204 that follows, as at S1106, whether or not the registration request received at S1201 has been made during the job processing is determined. In a case where the determination results indicates that the request has been made during the job processing, the processing advances to S1205 and in a case where the request has not been made during the job processing, this processing is terminated.

At S1205, as at S1108, based on the printing and the color measurement results of the print job after the processing is resumed, a new record of the selected feeding cassette is added to the reference value management table and the reference value data corresponding to the changed sheet type is registered newly in the reference value storing unit 309. At this time, the reference value data corresponding to the changed sheet type relating to the registration request is generated and registered newly in the reference value storing unit 309 based on the printing results of the printed page immediately after the resumption and the reference value data is associated directly. After that, the correction value data corresponding to the changed sheet type is generated and registered newly in the correction value storing unit 310 based on the printing results of the subsequent page and a record with which the correction value data is associated directly is generated. That is, in Case 2, the reference value data and the correction value data are managed in direct association with each feeding cassette as individual real data instead of the reference form.

As above, according to the present embodiment, unless the sheet type set to the feeding cassette is changed, the correction value for tone correction is fed back continuously without a break between a plurality of print jobs. As a result of that, for example, in a case also where a large number of print jobs having a small number of pages are processed continuously, it is possible to suppress the tone variation across the print jobs. In the present embodiment also, it is not possible to eliminate the occurrence itself of the blank period (period during which tone correction is not performed) from the reference value reacquisition until the correction value generation in a case where the sheet type is changed, but it is possible to limit the occurrence frequency to immediately after the sheet type is changed. (Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in a case where tone correction is performed real time during print job processing, it is possible to reduce the occurrence of a feedback delay while maintaining the suppression effect of the tone variation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-031678, filed Feb. 27, 2020 which is hereby incorporated by reference herein in its entirety.

What is claimed is:

1. A printing apparatus, comprising:
an image forming portion which forms a chart image on a sheet conveyed from a sheet feeding deck;
a color measure portion which performs color measurement by reading the chart image formed by the image forming portion;
one or more controllers including one or more processors and one or more memories, the one or more controllers configured to:
generate correction data based on color measurement results of the chart image by the color measurer portion and a reference value; and
perform correction for target image data by using the generated correction data,
wherein the reference value is obtained by performing color measurement of the chart image on the sheet by the color measure portion, the reference value is registered in association with a first type of sheet, and in a case where the first type of sheet on which the chart image is formed is changed to a second type of sheet, the reference value is updated by performing color measurement of the chart image of the second type of sheet.

2. The printing apparatus according to claim 1, wherein the one or more controllers are configured to set, as the reference value, a value obtained by the color measure portion performing color measurement of a chart image on a sheet conveyed from a first sheet feeding deck accommodating a sheet of the first type, and
in a case where the sheet feeding deck which feeds a sheet is switched from the first sheet feeding deck to a second sheet feeding deck accommodating a sheet of the second type, the set reference value is updated to a new reference value.

3. The printing apparatus according to claim 1, wherein the sheet of the first type and the sheet of the second type are sheets of different types.

4. The printing apparatus according to claim 1, wherein on the sheet, the chart image is printed on an area different from an area in which an image designated by a print job is printed.

5. The printing apparatus according to claim 1, wherein the correction data is generated based on a difference between the color measurement results and the reference value.

6. A method of controlling a printing apparatus, comprising:
forming a chart image on a sheet conveyed from a sheet feeding deck;
performing color measurement by reading the formed chart image;
generating correction data based on the color measurement results of the chart image and a reference value; and
correcting for target image data by using the generated correction data,
wherein the reference value is obtained by performing color measurement of the chart image on the sheet, the reference value is registered in association with a first type of sheet, and in a case where the first type of sheet on which the chart image is formed is changed to a second type of sheet, the reference value is updated by performing color measurement of the chart image of the second type of sheet.

7. The control method according to claim 6, further comprising setting, as the reference value, a value obtained by performing color measurement of a chart image on a sheet conveyed from a first sheet feeding deck accommodating a sheet of the first type, and
in a case where the sheet feeding deck which feeds a sheet to an image forming portion is switched from the first sheet feeding deck to a second sheet feeding deck accommodating a sheet of the second type, the set reference value is updated to a new reference value.

8. The control method according to claim 6, wherein the sheet of the first type and the sheet of the second type are sheets of different types.

9. The control method according to claim 6, wherein on the sheet, the chart image is printed on an area different from an area in which an image designated by a print job is printed.

10. The control method according to claim 6, wherein the correction data is generated based on a difference between the color measurement results and the reference value.

* * * * *